Aug. 19, 1969　　　M. B. CONRAD　　　3,461,959
RETRIEVABLE BRIDGE PLUG
Filed Aug. 19, 1965　　　　　　　　　　6 Sheets-Sheet 1
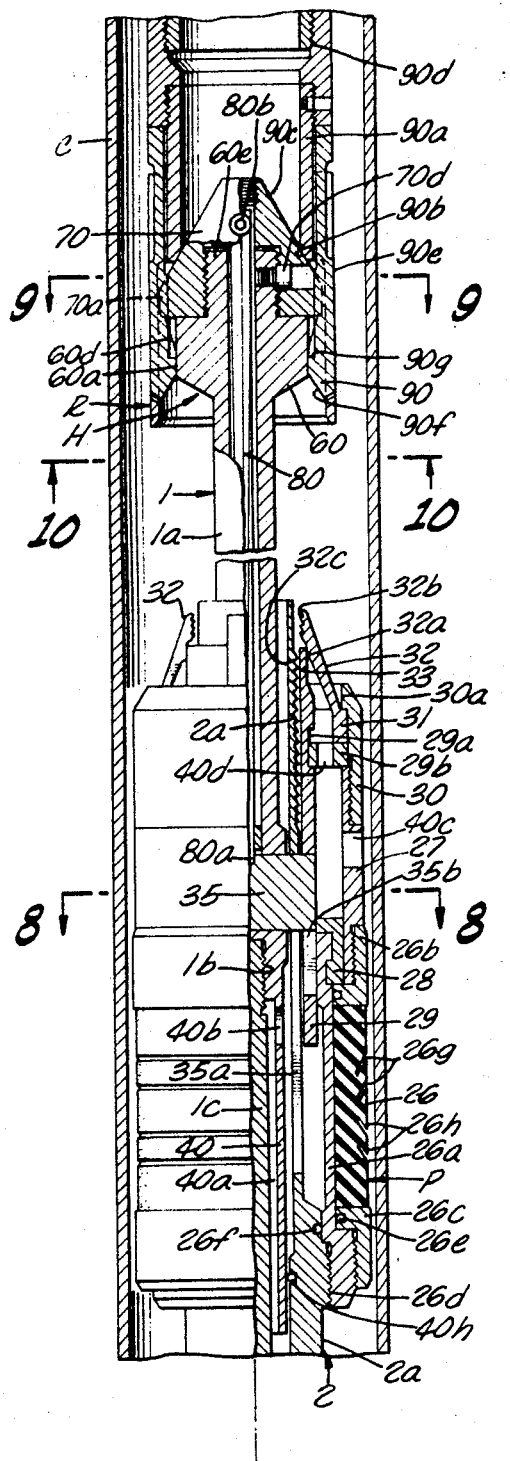
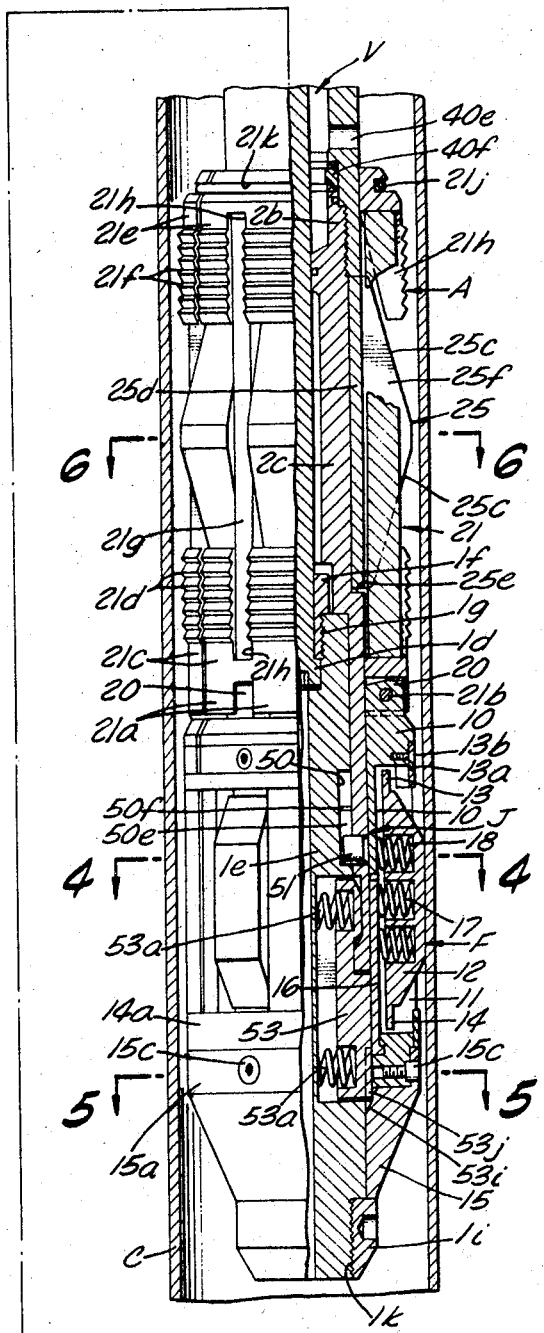
FIG. 1.
INVENTOR.
MARTIN B. CONRAD
BY
Lyon & Lyon
ATTORNEYS

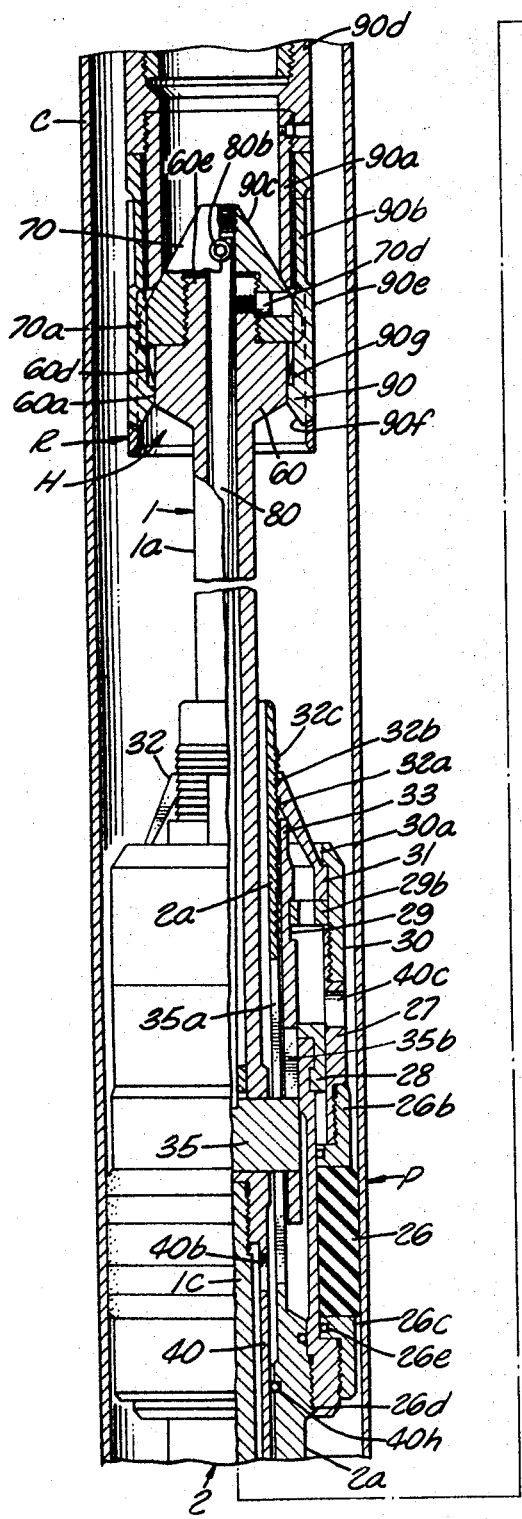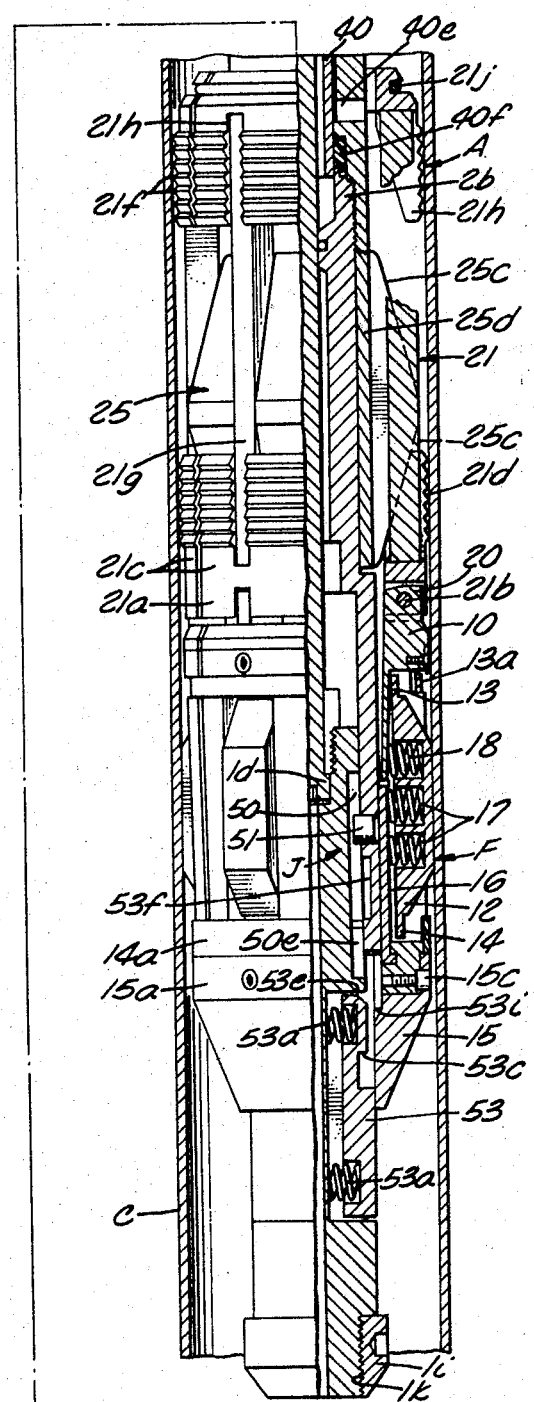

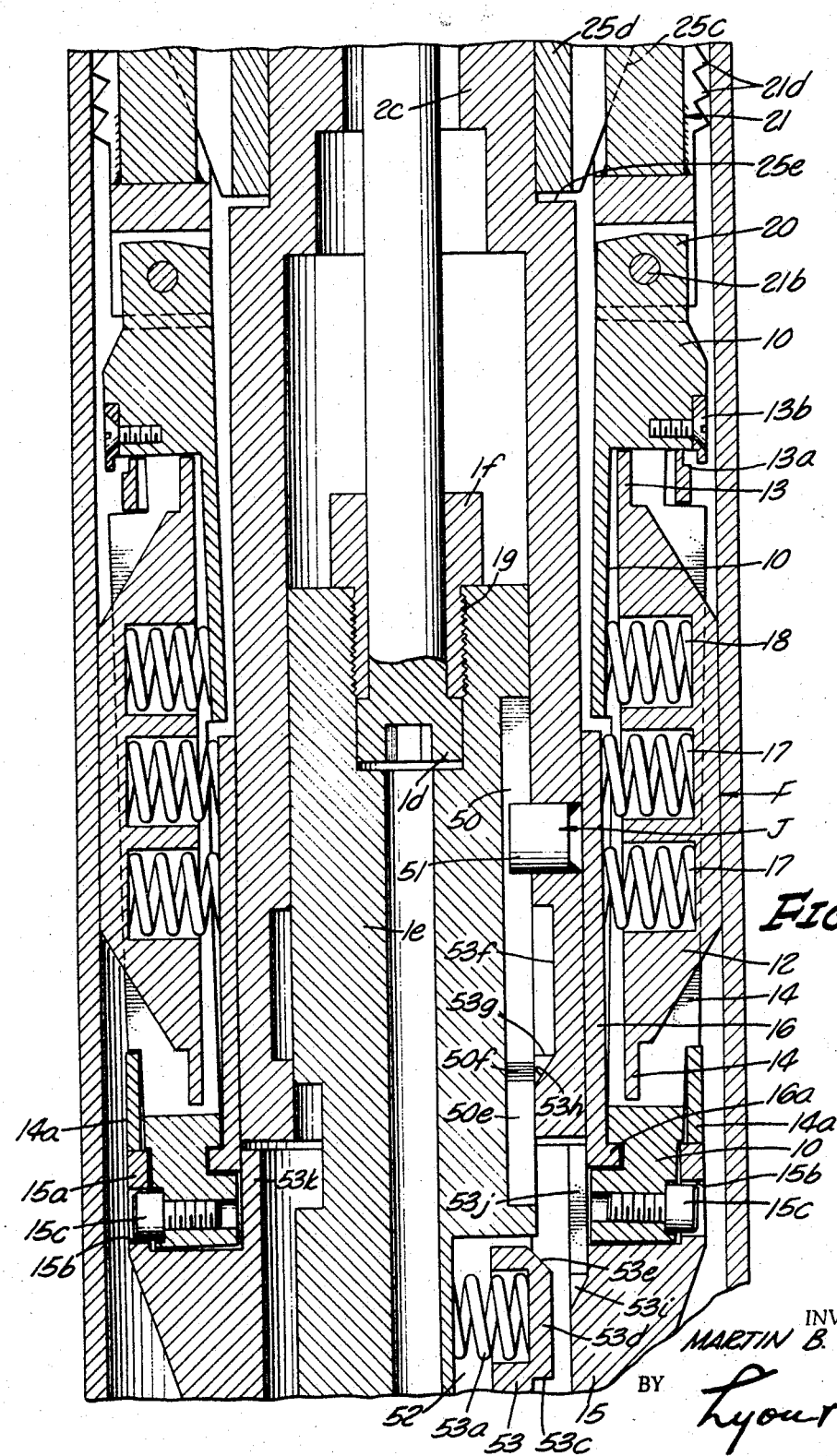

Aug. 19, 1969
M. B. CONRAD
3,461,959
RETRIEVABLE BRIDGE PLUG
Filed Aug. 19, 1965
6 Sheets-Sheet 4
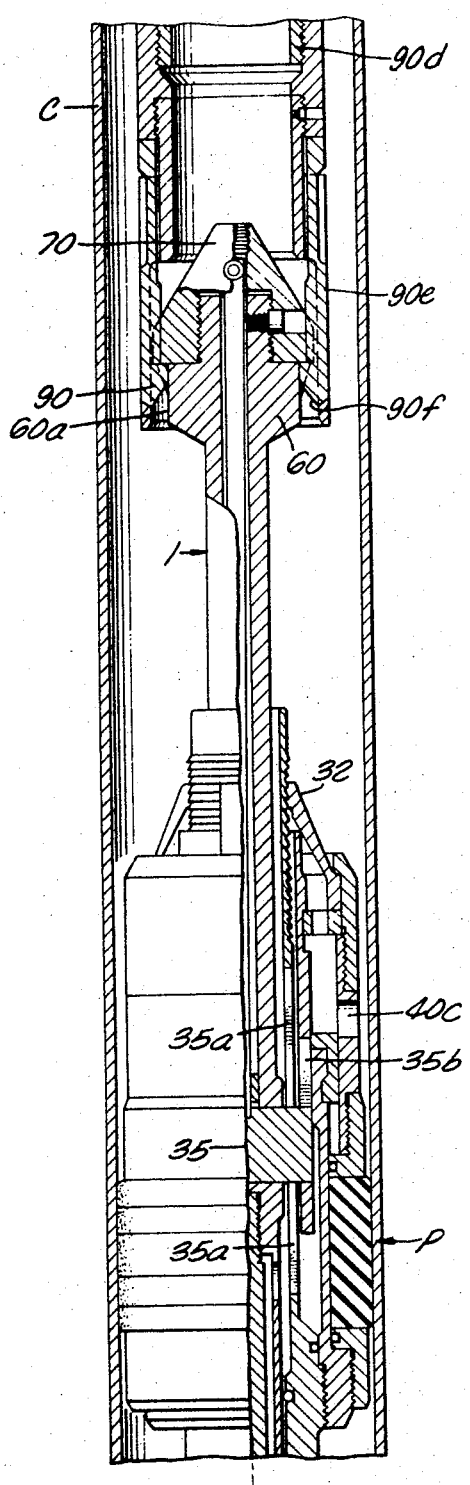
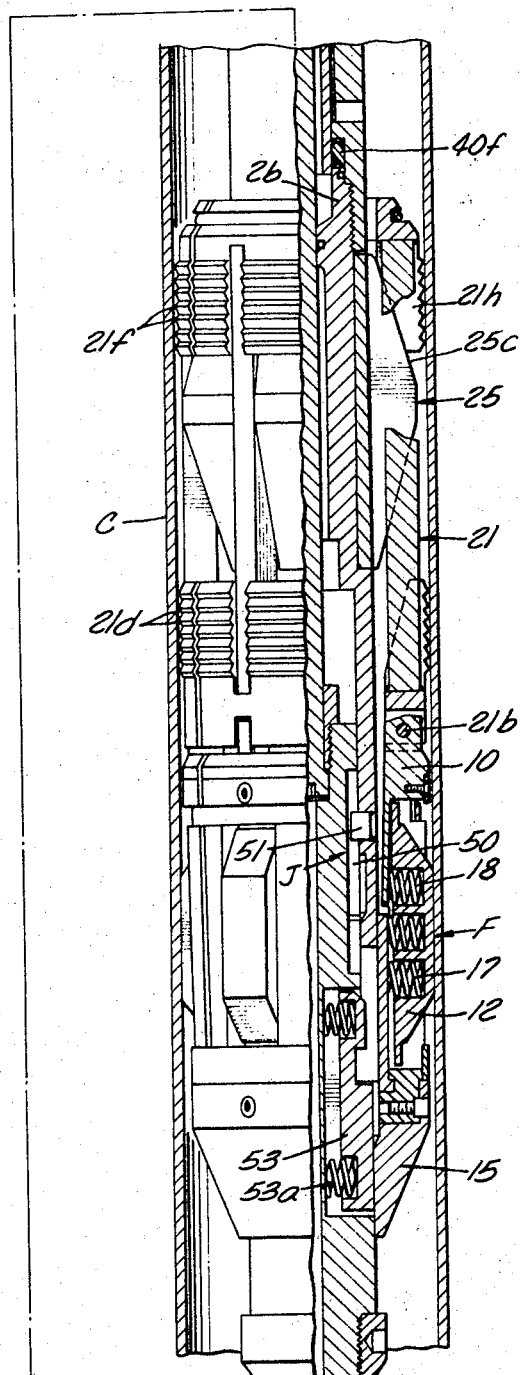
FIG. 3.
INVENTOR.
MARTIN B. CONRAD
BY Lyon & Lyon
ATTORNEYS

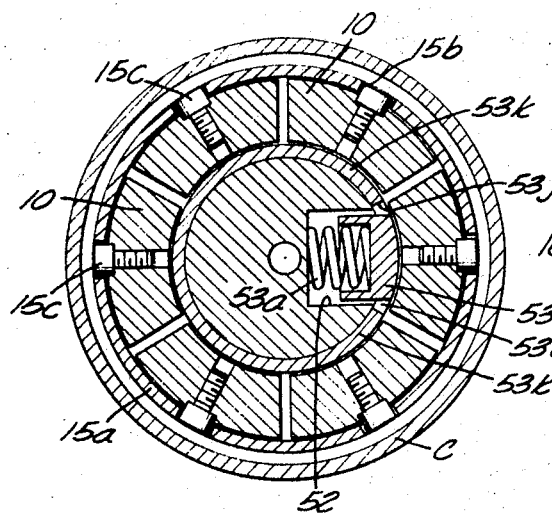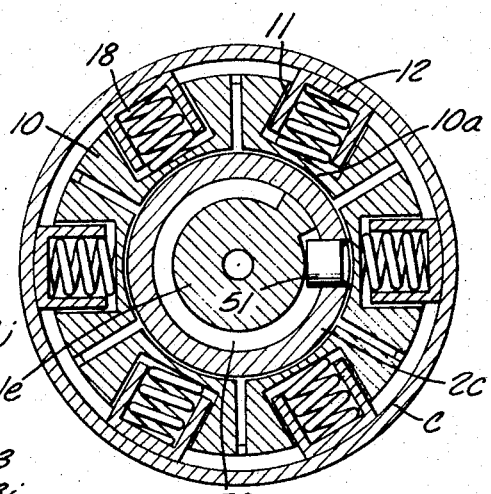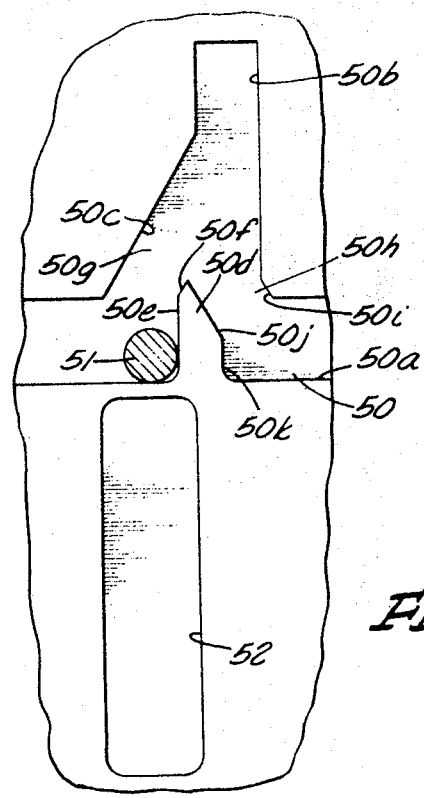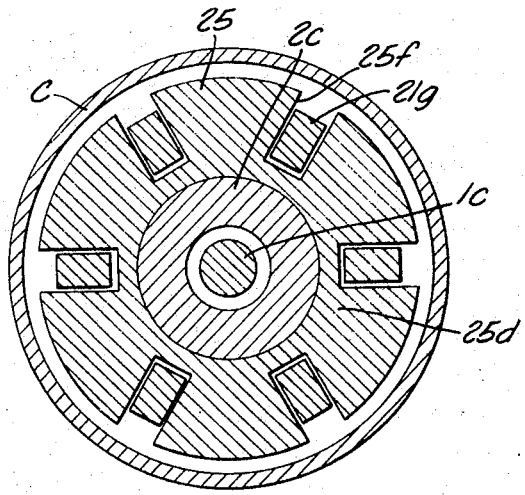

Aug. 19, 1969
M. B. CONRAD
3,461,959
RETRIEVABLE BRIDGE PLUG
Filed Aug. 19, 1965
6 Sheets-Sheet 6
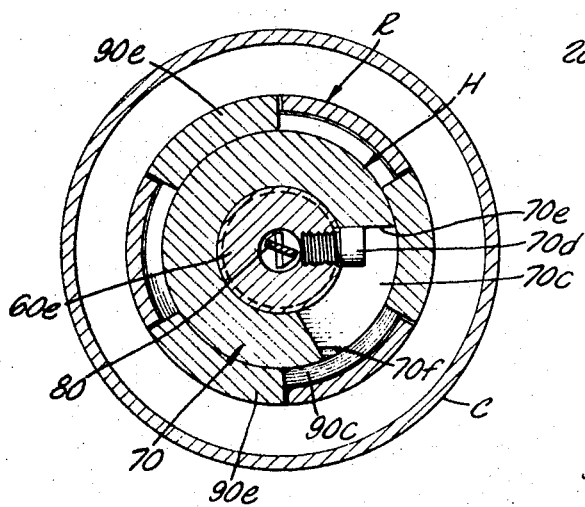
FIG. 9.
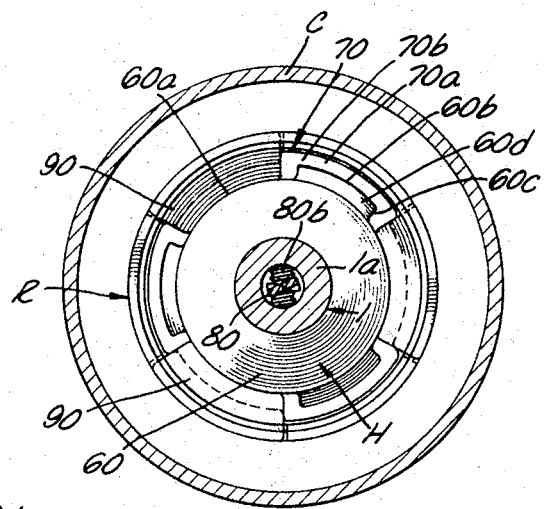
FIG. 8.
FIG. 10.
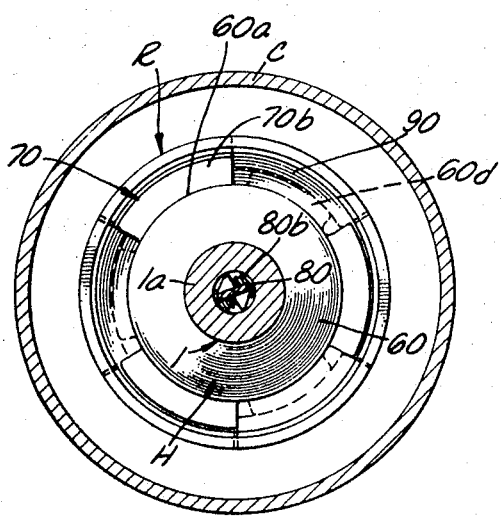
FIG. 11.
INVENTOR.
MARTIN B. CONRAD
BY
Lyon & Lyon
ATTORNEYS

United States Patent Office 3,461,959
Patented Aug. 19, 1969

3,461,959
RETRIEVABLE BRIDGE PLUG
Martin B. Conrad, P.O. Box 1026,
Downey, Calif. 90240
Filed Aug. 19, 1965, Ser. No. 480,899
Int. Cl. E21b 33/124, 33/129, 23/06
U.S. Cl. 166—123                        19 Claims

ABSTRACT OF THE DISCLOSURE

A retrievable bridge plug having a well wall sealing rubber, internal valves, and an anchor assembly in which slip units including interconnected pairs of slip elements coact with an expander cone located between the slip elements, and control rod effects actuation of the values and controls operation of the anchor assembly.

---

The present invention relates to well tools and more partcicularly to improvements in packers of the type generally referred to as "bridge plugs," such packers being adapted to be set in a well bore on a wire line setting tool or on a string of running in pipe and being retrievable or movable in the well to another location following the performance of the well treating operations in which the bridge plug plays a part.

Bridge plugs are employed to form a barrier in a well casing, for example, to isolate a zone to be treated with fluid from a zone which is not to be treated with such fluid. Examples of such fluid treatments are acidizing and fracturing of the earth formation traversed by the well bore.

Among the problems encountered in the bridge plug field is the need for an efficient yet compact anchor mechanism to secure the assembly within the well bore against pressure applied from above or below. Such an assembly desirably should be confined within the longitudinal limits of the tool body so as to be protected from damage, say in the event that the tool be run so deep as to engage the bottom of the bore hole or a body of material bridging the well bore.

In addition, the tool should be susceptible of recovery with certainty as to engagement of a recovery tool with the bridge plug, preferably without regard to a particular or special relative orientation of the recovery tool and the retrieving head of the bridge plug.

Accordingly, among the objects of the present invention is the provision of a bridge plug having a novel anchor mechanism of essentially unitized construction and adapted to be wholly located between the ends of the tool, such anchor mechanism including well bore wall engaging friction means and upwardly and downwardly holding slip means interconnected with the friction means so as to be expanded by movement of the body of the tool in either direction longitudinally of the well bore, either to enable initial setting or to resist longitudinal movement of the tool responsive to high fluid pressure differential applied to the tool in either direction.

Another object is to provide a bridge plug which may be retrieved with certainty by a recovery tool engageable with the upper end of the tool and without requiring that the recovery tool be oriented in any particular relation to the bridge plug.

More specific objects of the invention contemplate the provision of a control mechanims for preventing premature setting of the tool in a well bore, which control mechanism is adapted to operate cyclically so that the recovery tool may be rotated in one direction only in the process of setting the plug as often as setting of the same may be desired. In addition, the plug is so constructed that it is releasably locked in a set condition when the setting tool is removed, and the tool is provided with by-pass valve means to facilitate running of the tool through a body of well fluid, such valve means being closed during setting of the tool and opened to allow the balancing of any pressure differential across the tool when the tool is being recovered, so that when the valve means is closed, the packing element will effect anchoring of the anchor means in either direction in response to perssure differentials.

Other objects and advantages of the invention will become apparent from the following detailed description of an illustrative embodiment of a tool made in accordance with the invention and illustrated in the accompanying drawings, wherein:

FIG. 1 is a view partly in elevation and partly in longitudinal section showing the tool run into a well bore on a running in string of pipe and in condition to be set responsive to further downward movement of the running in string;

FIG. 2 is a view corresponding to FIG. 1, but showing the tool set in the well bore and holding pressure from above;

FIG. 2A is a partial section of the lower portion of the tool of FIG. 2;

FIG. 3 is a view corresponding to FIG. 2, but showing the tool holding pressure from below;

FIG. 4 is a transverse sectional view as taken on the line 4—4 of FIG. 1;

FIG. 5 is a transverse sectional view as taken on the line 5—5 of FIG. 1;

FIG. 6 is a transverse sectional view as taken on the line 6—6 of FIG. 1;

FIG. 7 is a fragmentary planar projection of the control slots in the tool body;

FIG. 8 is a transverse sectional view as taken on the line 8—8 of FIG. 1;

FIG. 9 is a transverse sectional view as taken on the line 9—9 of FIG. 1;

FIG. 10 is a transverse sectional view as taken on the line 10—10 of FIG. 1; and FIG. 11 is a view corresponding to FIG. 9, but showing the control head in a condition to release the setting and recovery tool.

Like reference characters in the drawings and in the following description designate corresponding parts.

Referring to FIG. 1, the retrievable bridge plug is illustrated as being run into a well having casing C set therein. The bridge plug has a recovery head H supported in a setting and recovery tool R which is at the lower end of a string of running in pipe, as is well known in the art.

The bridge plug includes associated casing or well wall engaging friction means F, casing or well wall engaging anchor means A, casing or well wall engaging sealing or packer means P, control means J for enabling the tool to be run into and retrieved from a well with the anchor means retracted, valve means V which allow fluid to pass through the bridge plug as it is being run into a well and retrieved but operative to prevent such passage of fluid when the bridge plug is set in the well so that fluid pressure differential across the packer P in either direction will cause a related holding action by the anchor means A, and the aforementioned head H whereby the tool may be run into the well and released.

From the foregoing general characterization of the subject bridge plug, it will be recognized that it is similar to plugs heretofore provided which may be run into a well and retrieved on a running in string of pipe or on wire line, and that while in the illustrative showing the packer means P is adapted to be set by manipulation of the running in pipe string, the bridge plug is essentially the same and functions similarly to a typical cup packer type bridge plug when the plug is released in the well bore, i.e., it holds against pressure from either direction, and the holding effort is a funtion of differential pressure across the packer P, the plug remaining set until the differential pressure is relieved.

Referring now in more detail to FIG. 1, it will be noted that the subject bridge plug includes a center or control rod 1 extending longitudinally of the tool and comprising an upper hollow end section 1a connected at a thread 1b to an intermediate rod section 1c, the latter having a polygonal head 1d at its lower end, retained in a complemental socket in the lower rod section 1e by a retainer nut 1f threadedly engaged at 1g with the lower rod section. At its lower end the body section 1e is provided with a threaded neck 1h for reception of a nut 1i. It will now be appreciated that the above mentioned head H, which will be hereinafter more fully described, is at the upper end of rod 1 and the nut 1i is at the lower end of the rod 1, with all working parts of the tool located therebetween.

Disposed about the inner rod 1 is a tubular assemblage 2 constituting the tool body. The tool body 2 includes an upper packer body 2a which extends from a location above the inner rod connection 1b to a location intermediate the ends of central rod section 1c, at which the packer body is connected at 2b to an anchor body 2c, and the latter extending downwardly in surrounding relation to the lower rod section 1e.

The casing engaging friction means F includes a circumferentially spaced plurality of support segments 10 having elongate slots 11 in each of which is a drag block 12 having end ears 13 and 14. The end ears 13 are confined within the respective slots 11 by a ring segment 13a, one of which is secured to each support segment 10 by a fastener 13b so as to overlie the adjacent end of the slot 11 and be engageable by the drag block ear 13.

At the opposite end of the friction means, the drag block ears 14 are retained in the slots 11 by a retainer ring 14a which encircles the support segments 10 in overlying relation to the ears 14 to retain this end of drag blocks 12 in their slots 11. This retainer ring 14a is held in place by a skirt 15a formed on a bottom cap 15 which is in turn held against endwise displacement by the previously described bottom nut 1i. Skirt 15a, as best seen in FIG. 5, has a number of circumferentially spaced openings 15b for receiving the heads of cap screws 15c which threadedly engage in the respective support segments 10 to fix the circumferential spacing of the support segments 10. These retainer rings 14a, skirt 15a, and cap screw screw heads fit loosely to enable fulcrumming of this end of the support segments as will hereinafter appear.

Within the support segments 10 is a sleeve 16 having at one end an outer flange 16a which engages in grooves in the respective support segments. This sleeve forms a bottom for the slots 11 of drag block support segments 10 against which bottom a pair of coiled springs 17, 17 abut, these springs also engaging the drag blocks 12 to force the same outwardly for frictional engagement with the casing C. A third coiled spring 18 also acts to force the drag blocks 12 outwardly, but this third spring 18 engages an integral bottom wall section 10a formed as a part of the respective segments 10, as best seen in FIG. 4. For a purpose which will be hereinafter more fully described, it will now be recognized that the support segments are free to pivot outwardly at the upper end, fulcrumming about their lower ends within the skirt 15a by virtue of the loose fitting ports described above.

At its upper end, each of the drag block support segments 10 is provided with an ear or lug adapted to be pivotally connected with a unitized slip element 21, the latter having spaced ears or lugs 21a between which the ear 20 of the drag block support is disposed, with a pivot pin 21b pivotally interconnecting the ears. These ears and pins constitute means for pivotally interconnecting the respective drag block carrier segments to the respective unitized slip elements 21.

Each unitized slip element 21 includes a lower slip 21c in the form of a wedge and having teeth 21d disposed to engage the casing C to hold against downward movement and an upper slip 21e having teeth 21f for engaging the casing C to hold against upward movement. A connector bar 21g extends between the slips 21c and 21e to support the same in longitudinally spaced relation. Slips 21c have a slot 21h in which one end of a connector bar 21g is suitably fixed as by welding, and slips 21e have a slot 21h in which the other end of the bar 21g is suitably fixed as by welding, whereby the slips 21c and 21e are rigidly and integrally united.

The slip elements extend longitudinally of the body section C in circumferentially spaced relation about the body 2, and if desired, means may be provided for resiliently holding the upper ends of the slip elements close to or in engagement with the body 2 when the tool is in condition to be run into and retrieved from the well. In the illustrative embodiment, a garter spring in the form of a rubber-like O-ring 21j extends about the upper slips 21e in grooves 21k for the purpose of biasing the upper ends of the slip elements inwardly.

An expander 25 is provided between the upper and lower slips of the slip elements 21, this expander having a cone surface 25c opposing the slips 21c and a cone surface 25e opposing the upper slips 21e, so that upon movement of the cone in either longitudinal direction relative to the slips, the slips 21c or 21e, depending upon the direction of such movement, will be positively wedged into anchoring engagement with the casing.

Preferably, expander 25 is provided on a sleeve 25d which is disposed about the body section 2c between the lower extremity of the body section 2a and an opposing shoulder 25e provided on the body section 2c. In addition, the cone is longitudinally slotted as at 25f in a plurality of circumferentially spaced locations to accommodate slip connector rods 21g, as best seen in FIG. 6.

The sealing or packer means P previously referred to may comprise suitable cup packing elements adapted to sealingly engage the casing C to prevent passage of fluids between the interior of body 2 and the casing. In the illustrative embodiment, the packing means P includes a normally cylindrical packer element 26 of elastomeric or rubber-like material, disposed on a packer mandrel or sleeve 26a between an upper gage ring 26b and a lower gage ring 26c.

Gage ring 26c is threadedly connected to the lower end of packer mandrel 26a and the latter is threaded on the body section 2a at 26d. At this connection a seal ring 26e prevents leakage between gage ring 26c and the packer mandrel and seal ring 26f prevents leakage between the packer mandrel and body 2.

Packer rubber 26 is adapted to be deformed or expanded outwardly, upon movement of gage ring 26b toward gage ring 26c, and to sealingly engage the casing C. In order that the packer element 26 will effectively seal with the casing so as to respond to low pressure and prevent leakage, the element 26 is provided with a suitable number of oppositely opening conical grooves 26g and 26h respectively facing or opening upwardly and downwardly, the element 26 thus acting as opposed cups after it has been initially expanded into engagement with the casing.

Means are provided for effecting movement of gage ring 26b toward the gage ring 26c, including an actuator sleeve 27 to the lower end of which the gage ring 26b is threadedly connected. This sleeve 27 encircles a split ring 28 and retains the latter in assembled relation about the upper end of the packer mandrel 26, the split ring 28 limiting the movement of gage ring 26b upwardly on the packer mandrel. Thus, downward movement of sleeve 28 will effect axial and radial deformation of packer element 26 and upward movement of actuator sleeve 28 will allow the packer element 26 to resume its normal condition.

Also included in the means for moving the gage ring 26b is an inner actuator sleeve 29, the lower end of which extends between the packer mandrel 26a and body section 1a. Adjacent its upper end, the inner actuator sleeve 29 has an annular groove 29a in which are disposed the halves of a split actuator ring 29b, the latter being at its outer margin in abutment with the upper end of the outer actuator sleeve 27. A cap 30 is threaded on the sleeve 27 and secures the ring 29b in engagement with sleeve 27 together with a supporting ring 31 for ratchet dogs 32, the cap 30 having an end flange 30a engaging the dog feet and the latter engaging the split ring halves to force the same against the end of actuator sleeve 27.

Dogs 32 are composed of resilient arms projecting from the ring 31 toward the body section 2a. A dog lifter or shifter 33 is provided at the upper end of inner actuator sleeve 29 so that when the tool is in the condition shown in FIG. 1, the dog lifter is engaged with a lug 32a adjacent the free end of each dog to hold the same spaced from body section 2a. The axial extent of groove 29a in actuator sleeve 29 is such as to allow lost motion between actuator sleeves 27 and 29, whereby inner actuator sleeve 29 may move downwardly a distance sufficient to remove dog lifter 33 from the dog holding position so that dogs 32 may engage body section 2a before actuator ring 29b effects joint downward movement of both actuator sleeves 27 and 29. At their free ends, the dogs 32 have ratchet teeth 32b adapted to engage ratchet teeth 32b adapted to engage ratchet teeth 32c on the body section 2a.

Downward movement of the actuator sleeve 29 is effected by downward movement of the inner or control rod 1. This rod 1 carries a cross head 35 which extends transversely of the body 2, through elongate slots 35a therein, and the cross head projects into slots 35b extending lengthwise of the actuator sleeve 29. The length of slot 35b is such as to assure proper operation of the valve means V, as will hereinafter appear, but it will be apparent that downward movement of cross head 35 will ultimately cause first downward movement of inner actuator sleeve 29 and after the dogs 32 have been released the outer actuator sleeve 27 will be moved downwardly by the actuator ring 29b, the dogs 32 ratcheting over the body teeth 32c to hold the actuator sleeve 27 in the downward position, as shown in FIG. 2, with the packer element 26 expanded.

Again referring to valve means V, the inner rod 1 and more particularly, the upper rod section 1a, has an elogate skirt 40 which extends downwardly in spaced relation about rod section 1c to define a passage 40a. Passage 40a communicates with the well bore above the packer through one or more ports 40b in skirt 40, and through slots 35a and 35b as well as through ports 40c in actuator sleeve 27 and ports 40d in actuator ring 29. Beneath packer element 26, and more particularly in body section 2a, is one or more ports 40e, whereby when the tool is being run in or retrieved, fluid may pass through the ports and the passage, and as will appear hereinafter, pressure differential across the packer may be balanced to enable release of the tool. At its outer periphery valve member 40 extends through a seal 40h and at this seal the cross section of the valve member 40 is less than the cross section of the upper portion of rod 1, whereby a differential area subjected to well pressure above the packer 26 and below the same will cause the valve to be hydraulically closed when the packer is set and fluid pressure is applied above.

Downward movement of the rod 1 will move the skirt 40 downwardly until its lower end is, as shown in FIG. 2, within a seal ring assembly 40f, thereby closing off the bypass. Such motion of valve skirt 40 is permitted by slots 35b in actuator sleeve 29, without causing opeartion of the actuator mechanism, such opeartion being effected when setting the tool only when the cross head 35 reaches the bottom of slots 35b, as shown in FIG. 2, when the tool is being set, and conversely when the cross head reaches the top of slot 35b when the tool is being released. In other words, slot 35b provides a lost-motion connection between the cross head and the actuator sleeve 29, whereby the valve V may be opened and closed without affecting the actuator means for the packer element 26.

Relative longitudinal movement of the center rod 1 and the body 2 is, however, under the control of the control means J previously referred to so that such movement can be effected only after preconditioning the control means which will now be described.

Referring particularly to FIGS. 1, 4, 5, and 7, it will be noted that the lower control rod section 1c is provided with a control slot 50 into which a follower or pin 51 projects, this pin 51 being carried by the lower body section 2c. Spaced downwardly from the control slot 50 is an elongate control dog receiving slot 52 in which is a control dog 53 to be later described. Control slot 50 has a circumferentially extended portion 50a and a longitudinally extended portion 50b. One side wall 50c of slot 50 leads from longitudinal portion 50b to circumferential portion 50a at an angle. In addition, the circumferential slot portion 50a has a stop 50d therein, having a wall 50e extending longitudinally in opposing relation to the angular wall 50c and terminating at an angular wall 50f which parallels wall 50c to form an angular slot section 50g extending between the slot sections 50a and 50b at one side of stop 50d. At the other side of stop 50d another angular slot section 50h is formed between opposing angular walls 50i and 50j, the angular wall 50j extending from a point of juncture with wall 50f to a juncture with a longitudinal slot wall 50k at the opposite side of stop 50d from longitudinal wall 50e. It is now notable that relative rotation between the inner rod 1 and body 2 in either direction is limited by engagement of pin 51 with stop 50d. Longitudinal movement of the control rod relative to the body, when the same are in the positions shown in FIG. 7, will cause relative angular motion as the pin engages angular wall 50c en route to the longitudinal slot section 50b. As a consequence of such angular movement, reverse longitudinal movement of the inner rod and body will cause the pin to engage angular stop surface 50j and to pass through angular slot section 50b to the side of stop 50d opposite the side of the stop at which the pin is shown in FIG. 7.

The dog 53 and slot 52, as generallly referred to above, are longitudinally aligned with that portion of control slot 50 located at the side of stop 50d which is confronted by angular slot surface 50c, as seen in FIG. 7. A pair of coiled springs 53a are shown as means for biasing the dog 53 laterally or radially of the rod section 1e. This dog is in the form of an elogate block having a main body 53a provided with an external groove formed between opposing shoulders 53b and 53c, and with a lug 53d at its upper end formed between the shoulder 53c and a bevelled end surface 53e.

At the lower end of body 2, and more particularly within body section 2a, a circumferential channel or groove 53f is formed to receive the dog lug 43d, this groove having a radial shoulder 53g opposing lug shoulder 53c to hold the same against relative axial movement except in a relative angular relationship where the pin 51 is engaged with control stop surface 50e. At this angular location the shoulder 53g is bevelled as at 53h so that lug 53d on the dog may be inwardly cammed. Similarly, the bottom cap 15 is formed with an inner bevelled surface 53i for camming inwardly the body section 53a of the dog 53, this surface 53i being formed at the end of a slot 53j which extends longthwise in a skirt 53k provided on the cap 15 to receive the dog body 53a to assure alignment of the cam surfaces 53h and 53i when the dog is in the slot 53j, as shown in FIG. 5, and as will be more fully understood from a description of the setting of the tool appearing hereinafter.

The setting and recovery tool R and the tool head H include cooperative structure for effecting the necessary movements of the center rod 1. Referring to FIGS. 1, 9, and 10, it will be noted that the head H comprises a body 60, at the upper end of rod 1, this body having a circular outer wall 60a provided with a number of circumferentially spaced lugs 60b having radial side walls 60c and having upwardly flaring or diverging outer surface 60d. Illustratively, there are three such lugs on centers spaced 120°.

Connected to the body 60 on a threaded neck 60e is a rotary head member 70, it being notable that member 70 revolves as may be necessary on the threads of neck 60e. Member 70 has a diameter slightly less than or substantially equal to the maximum dimension at the lugs 60b of body 60 (see FIG. 10) and has lugs 70a on 120° spaced centers which project outwardly and form radial shoulders 70b disposed normal to the axis of the head. It is desired that the member 70 and body 60 of the head be normally so oriented that, as seen in FIG. 10, the lugs 60b and 70a are aligned, but during release of the tool it is desired that the lugs 60a and 70a be 120° out of phase, as seen in FIG. 11. Thus, means are provided for limiting relative rotation of member 70 and for normally maintaining the member 70 at the limit of its movement in one direction.

Such means in the illustrative embodiment comprises a slot 70c in the member 70 opening outwardly and a pin 70d carried by the body 60, the slot 70c terminating in an abutment 70e at one end and an abutment 70f at the other end. A spring normally holds member 70 in a position with the pin 70d engaging abutment 70e and hence with lugs 60b and 70a aligned. This spring is shown as a torsion bar 80 which extends through the hollow inner rod section 1a and has its lower end seated in a slot 80a in the cross bar 35, the upper end of the spring or torsion bar 80 is engaged between a pair of set screws 80b in the member 70. Hence, the bar 80 must be twisted to permit angular movement of pin 70b away from abutment 70e. In addition, the bar 80 is under pre-stress when member 170 is in its normal position, and such angular movements further stress the bar.

The setting and recovery tool R, includes an elongate tubular body 90 having an inside diameter larger than the maximum diameter of head H and having suitably disposed therein an inner body portion 90a having an abutment surface 90b engageable with the conical end surface 90c of the head H. At its upper end the tool R is formed as at 90d for connection with a string of running in pipe in the embodiment now being described, on which the packer assembly is to be run into the well and set.

Forming a part of the tool body 90 is a number of spring fingers 90e having outwardly flaring lower end surfaces 90f and internal shoulders 90g. These fingers 90e are such that they normally would assume positions at which the surface extending between flared surfaces 90f and shoulders 90g would be on a diameter less than the diameter of lugs 60b on head body 60. The angular spacing of fingers 90e is such that they will interfit between lugs 70a on member 70 with the ends of the fingers engaging body 60 on its cylindrical wall 60a, as seen in FIG. 1, for example.

It will now be apparent that rotation of member 70 to the position of FIG. 11 places the bevelled surfaces 60d of lugs 60b in the spaces between lugs 70a of member 70 so that the fingers may be cammed outwardly by the bevelled lug surfaces 60d to allow separation of the tool R from the head H. Re-engagement will be effected merely by forcibly moving the tool R endwise onto head H so that the flared finger surfaces 90f will spread the fingers. No special orientation of the member 70 on head body 60 is required for this purpose since shoulders 90g of the finger ends will interlock either with the radial surfaces 70b of lugs 70a or with the radial surface between the lugs 70a.

Operation

In the use of the tool thus far described it will be run into a well as shown in FIG. 1, with the drag block 12 contacting the well casing, but with the anchor means A and packer means P held inoperative by the control means J and with the valve means V open. When the location in the well is reached at which the tool is to be set, the running in string is rotated to rotate the center rod 1 so that the control stop 50d will be moved into engagement with the control pin 51 at the longitudinal stop wall 50e, as shown in FIG. 7. In the illustrative embodiment thus far described such rotation would be right-hand and therefore in a direction similar to that required to tighten the joints in the running in string of pipe. Thus, as also shown in FIG. 1, the dog 53 is in a position to be cammed inwardly by bevelled surfaces 53h and 53i, whereas prior to rotation and in all other relative angular locations of the dog 53, the lug shoulder 53c thereof engages wall 53g of body 2 to cause simultaneous downward movement of the outer body 2 with the inner rod 1.

As the inner rod is now moved downwardly relative to the friction means, the cross rod 35 moves first to the bottom of slot 35b in actuator sleeve 29 during which movement valve member 40 is moved to the closed position shown in FIG. 2. Thereafter, actuator sleeve 29 will be moved downwardly as permitted by the lost motion connection between the member 29 and ring 29b, so that dog shifter 33 is moved downwardly from within the ratchet dogs 33.

Setting of the slips 21c will then be effected by further downward movement of the rod 1 and simultaneous downward movement of the entire outer body 2. Slip setting force is transmitted from actuator 29, through ring 29b to outer actuator sleeve 27, and thence through the rubber 26 and to the cone 25 which is forced downwardly to urge the lower slips outwardly. When the holding effect of the slips overcomes the resistance of the rubber to deformation, the rubber 26 will be axially shortened and radially expanded into sealing contact with the casing.

During such anchoring movement, it will be apparent that the body section 2a in moving downwardly will cause camming engagement of pin 51 with angular control slot surface 51 to cause slight rotation between the inner rod and the body so that the pin will assume a position adjacent the upper end of longitudinal slot section 50b. Upon moving the inner rod upwardly, the pin 51 will engage stop surface 50j and be cammed to the other side of stop 50d from that shown in FIG. 7. The tool will accordingly be again latched by the control dog 53 for movement to a different location. Thus, the control is seen to function cyclically always requiring repetition of the sequence of motions.

If the well tool is anchored and to be released from the setting tool R, an upward pull is taken on the running in string while right hand torque is held on the head H so that the lugs 60b and 70a are out of alignment as shown in FIG. 11, and the fingers 90 will be cammed outwardly and pass over the bottom of the member 70. Obviously, the resistance of fingers 90 to outward flexure cannot be so great as to cause release of the packer 26 and the anchor means. In the case of a liquid filled casing, however, the hydrostatic column tends to hold the packer set, and will cause a differential pressure across the valve means V which will hold the valve closed. In the case of setting the tool in a dry casing, the valve may be pulled open but will be closed hydraulically when the pumping of fluid down the casing is commenced. Hence, the valve means is adapted to be mechanically closed and opened during setting and release of the tool, but is hydraulically closable to prevent the bypass of fluid around the packer means.

After the packer 26 is expanded, differential fluid pressure applied either above or below will effect corresponding bodily movement of body 2 and hence cone 25 to cause corresponding anchoring expansion of the slips 21c and 21e. As best seen in FIG. 2, when the slips are expanded the carriers or support segments 10 articulate between the pivots 21b and the loose fitting connection of the lower ends of such segments with the bottom cap 15.

When the assembly is to be recovered or moved to another location in the well bore, the running in string of pipe is lowered to effect engagement of the retrieving tool R with the head H. As the recovery tool body 90 moves downwardly over the upper extremity of the head H the conical head surface 90c will centralize the recovery tool as the surfaces 90f of fingers 90e cause expansion of the fingers. The free ends of the fingers will pass beyond the lower surface of head member 70, and irrespective of the relative orientation between the fingers 90e and the head member 70, the finger lugs 90g are interlockingly engageable with head member 70, either with the lugs 70a or with the lower surface of head member 70 which intervenes between the lugs 70a. Thereafter, an upward pull on the running in string will cause opening of the valve means and release of the packer means and anchor means, as will now be understood.

While specific structural details have been shown and described, it should be understood that changes and alterations may be resorted to without departing from the spirit of the invention as defined in the appended claims.

I claim:

1. A retrievable bridge plug assembly adapted to be disposed in a well bore, comprising: an elongated tubular body, an operating rod extending through said body and having setting and recovery head means at its upper end for releasably connecting said assembly to a running in tool, said body having thereon packer means sealingly engageable with the well wall and anchor means for anchoring engagement with said well wall to anchor said assembly against upward movement and against downward movement upon the application of pressure differential across said packer means respectively from below and above said packer means, said body and said inner rod carrying valve means operable to prevent the passage of fluid through said body past said packer, and means for causing movement of said body and inner rod as a unit in said well bore during running and recovery of said assembly, said anchor means including a cone member carried by said body and having opposite ends provided with oppositely disposed conical surfaces, a plurality of slip units spaced about said body and each having a pair of axially spaced slip elements disposed in opposed relation to said cone member at said opposite ends thereof for engagement of the respective slip elements of each unit with said conical surfaces, a connector member rigidly interconnecting each pair of slip elements for unitary movement and spanning said cone member, and means interconnecting said slip units about said body.

2. A retrievable bridge plug assembly as defined in claim 1, wherein said cone member is longitudinally slotted, and said connector member of each slip unit extends through a slot in said cone member.

3. A retrievable bridge plug as defined in claim 1, wherein said means interconnecting said slip units about said body includes means resiliently urging said slip units toward said body.

4. A retrievable bridge plug as defined in claim 1, wherein said means interconnecting said slip units about said body includes a resilient band encircling the slip elements at one end of said cone member.

5. A retrievable bridge plug as defined in claim 1, wherein said means interconnecting said slip units about said body includes a link having pivotal connection with a slip element of each slip unit and means resiliently urging said pivotal connection toward said body.

6. A retrievable bridge plug as defined in claim 1, wherein said means interconnecting said slip units about said body includes an elongated drag block carrier having at one end pivotal connection with a slip element of each slip unit, a slot in said drag block carrier, a drag block disposed in said slot, spring means in said slot urging said drag block outwardly for engagement with the well wall, means supporting the other end of said drag block carriers for pivotal movement of said drag block carriers, and a portion on each drag block carrier engaged by said spring means to urge said drag block carriers inward.

7. A retrievable packer assembly adapted to be disposed in a well bore, comprising: an elongated tubular body having thereon packer means sealingly engageable with the well wall, friction drag means engageable with the well wall, a control member having means connectable to a running in string, control means interconnecting said control member, said friction drag means and said body to cause longitudinal movement thereof as a unit in said well bore and operable to release said control member and body for longitudinal movement relative to said friction drag means, means operable by said control member upon release of said control means to move said body longitudinally relative to said friction drag means, anchor means including a cone member carried by said body and having oppositely facing cone surfaces, a plurality of circumferentially spaced slip units including opposing slip elements engageable with the opposing cone surfaces for anchoring said body in said well bore against movement of said assembly in either direction, each slip unit including a connector bridging said cone member and interconnecting the slip elements of said unit, said cone member having a slot through which said connector extends, and means providing an articulated connection between said friction drag means and one end of each slip unit.

8. A retrievable packer as defined in claim 7, wherein said means providing an articulated connection comprises a plurality of circumferentially spaced elongated drag block carriers each having at one end a pivotal connection with a slip unit, means pivotally mounting the other ends of said drag block carriers, said friction drag means including drag blocks carried by said drag block carriers, and means resiliently urging said drag blocks outwardly for engagement with the well wall.

9. A retrievable packer as defined in claim 7, wherein said means providing an articulated connection comprises a plurality of circumferentially spaced elongated drag block carriers each having at one end a pivotal connection with a slip unit, means pivotally mounting the other ends of said drag block carriers, said friction drag means including drag blocks carried by said drag block carriers, and means resiliently urging said drag blocks outwardly for engagement with the well wall and urging said one end of said slip units inwardly.

10. A retrievable packer as defined in claim 9, including means resiliently urging the other ends of said slip units inwardly.

11. A slip and drag block assembly for well packers, comprising: an elongated body having a cone member thereon provided with oppositely facing cone surfaces, said cone member having a number of circumferentially spaced slots extended longitudinally therethrough, a bar extending through each slot, slip elements at the ends of said bar respectively engageable with one of the cone surfaces, a plurality of elongate drag block carriers spaced about said body, means pivotally connecting an end of each carrier to a slip of one of said slip units, means pivotally mounting the other end of each carrier on said body, a drag block carried by each carrier, and spring means engaged with said drag block to urge the same outwardly relative to said carrier.

12. An assembly as defined in claim 11, wherein each carrier is provided with a portion interposed between said spring means and said body whereby said slip units are urged inwardly.

13. An assembly as defined in claim 11, wherein the means pivotally mounting the other ends of said carriers comprises a member encircling said body within said carriers and another member encircling said body, and means loosely interconnecting said body encircling members and said carriers.

14. A retrievable bridge plug assembly adapted to be disposed in a well bore, comprising: an elongated tubular body, an operating rod extending through said body and having setting and recovery head means at its upper end for releasably connecting said assembly to a running in tool, said body having thereon packer means sealingly engageable with the well wall and anchor means for anchoring engagement with said well wall to anchor said assembly against upward movement and against downward movement upon the application of pressure differential across said packer means respectively from below and above said packer means, said body and said inner rod carrying valve means operable to prevent the passage of fluid through said body past said packer, means for causing movement of said body and inner rod as a unit in said well bore during running and recovery of said assembly, said recovery head means including a head section stationary on said control rod, a head member rotatable on said head section, means for limiting rotation of said member in opposite directions, means normally biasing said head member to the limit of its movement in one direction, said head member having angularly spaced lugs projecting outwardly and said head member and said lugs having faces engageable by gripping fingers of a setting and recovery tool, and said stationary head section having cam sections spaced angularly corresponding to said lugs on said head member and normally aligned with said lugs on said head members, said cam sections projecting outwardly substantially to the full extent of the faces on said member between said lugs to cam the gripping fingers of a setting and recovery tool outwardly, upon movement of said head member to the limit in the other direction.

15. An assembly as defined in claim 14, wherein said control rod and said stationary head section have a central opening, said biasing means comprising a torsion spring extending through said opening and being connected at one end to said head member and to said control rod at the other end.

16. An assembly as defined in claim 14, wherein said control rod has a neck on which said head member is revolvable relative to said stationary head section, and wherein the means for limiting rotation of said head member includes a radial opening in said member defined between angularly spaced end walls, a pin fixed to said neck and projecting into said slot.

17. An assembly as defined in claim 14, wherein said control rod has a threaded neck on which said head member is revolvable relative to said stationary head section, and wherein the means for limiting rotation of said head member includes a radial opening in said member defined between angularly spaced end walls, a pin fixed to said neck and projecting into said slot.

18. A retrievable bridge plug as defined in claim 1, wherein said packer means comprises a cylinder of resilient material on said body and said body comprises actuator means engaged with said resilient material, said means for causing unitary movement of said control rod and said body being releasable to allow movement of said control rod longitudinally of said body, said actuator means being connected to said control rod to cause axial deformation and outward expansion of said resilient material upon longitudinal movement of said control rod in one direction relative to said body, and latch means for holding said actuator means in a position with said resilient material so deformed.

19. An assembly as defined in claim 18, wherein said actuator means comprises a first actuator member and a second actuator member, means providing a lost motion connection between said members whereby said first actuator member moves a limited distance with said control rod before said second actuator member moves, said latch means including laterally movable latch elements, and a portion on said first actuator member engageable with said latch elements to hold the same spaced from said body when said first actuator member is in one position relative to said second actuator member.

References Cited

UNITED STATES PATENTS

| 2,162,179 | 6/1939 | Mueller | 166—134 |
| 2,799,386 | 7/1957 | Baker et al. | 166—133 |
| 3,158,202 | 11/1964 | Lewis et al. | 166—134 |
| 3,252,517 | 4/1966 | Lewis et al. | 166—134 |
| 3,314,480 | 4/1967 | Scott | 166—121 |
| 3,332,494 | 7/1967 | Scott | 166—121 |

JAMES A. LEPPINK, Primary Examiner

U.S. Cl. X.R.

166—133, 134